United States Patent [19]

McGinniss

[11] 4,066,523

[45] Jan. 3, 1978

[54] DUAL CURE CATHODIC ELECTROCOATING COMPOSITION

[75] Inventor: Vincent D. McGinniss, Valley City, Ohio

[73] Assignee: SCM Corporation, New York, N.Y.

[21] Appl. No.: 781,661

[22] Filed: Mar. 28, 1977

Related U.S. Application Data

[60] Division of Ser. No. 658,269, Feb. 17, 1976, Pat. No. 4,025,409, which is a continuation-in-part of Ser. No. 708,106, July 23, 1976, Pat. No. 4,035,272, which is a continuation-in-part of Ser. No. 595,448, July 14, 1975, abandoned.

[51] Int. Cl.$^2$ .................................................. C08F 8/00
[52] U.S. Cl. ........................... 204/159.15; 204/159.16; 204/159.18; 204/181; 260/29.2 EP; 260/29.2 N; 260/29.2 TN; 260/29.6 H; 260/22 CB; 260/77.5 AM; 260/836; 260/837 R; 260/859 R; 427/54; 428/418; 428/425; 428/457
[58] Field of Search ...................... 204/159.14, 159.15, 204/159.16, 181 E; 260/29.2 N, 29.2 TN, 29.2 EP, 29.6 H

[56] References Cited

U.S. PATENT DOCUMENTS

| | | | |
|---|---|---|---|
| 3,959,106 | 5/1976 | Bosso et al. | 204/181 |
| 3,975,251 | 8/1976 | McGinniss | 204/181 |
| 4,037,018 | 7/1977 | McGinniss | 428/418 |
| 4,039,414 | 8/1977 | McGinniss | 204/181 |

*Primary Examiner*—Richard B. Turer
*Attorney, Agent, or Firm*—Jerry K. Mueller, Jr.

[57] ABSTRACT

An electrocoating composition containing a polymer having pendant tertiary amine groups, a polymer containing pendant mercaptan groups, a bis-maleimide cross-linking agent, and a photosensitizer can be electrodeposited onto a cathode substrate disposed within an aqueous electrocoating bath. The amine groups and the mercaptan groups are protonated with acid to render the polymers water dispersible prior to electrodeposition and are adapted to become deprotonated upon electrodeposition. Full cure of the electrodeposited coating on the cathode substrate is obtained by the combination of heat curing and ultraviolet radiation curing. In a specific embodiment of the present invention, a single polymer contains both the pendant tertiary amine groups and pendant mercaptan groups.

8 Claims, No Drawings

DUAL CURE CATHODIC ELECTROCOATING COMPOSITION

CROSS REFERENCE TO RELATED APPLICATIONS

This application is a division of copending application Ser. No. 658,269, filed Feb. 17, 1976 now U.S. Pat. No. 4,025,409; which is a continuation-in-part of copending application Ser. No. 708,106, filed July 23, 1976 now U.S. Pat. No. 4,035,272; which is a continuation-in-part of application Ser. No. 595,448, filed July 14, 1975, now abandoned.

BACKGROUND OF THE INVENTION

This invention relates to electrodeposition of water dispersed polymers onto a cathode substrate and more particularly to cross-linking said electrodeposited polymers with a reactive bis-malemide by a combination of heat curing and ultraviolet radiation curing.

Applicant's copending application Ser. No. 708,106 describes an electrocoating composition of a polymer having pendant mercaptan groups in combination with a bis-maleimide cross-linking agent which composition can be electrodeposited onto a cathode substrate. This composition cures upon heating the electrocoated substrate or by ultraviolet irradiation of said electrocoating when an ultraviolet photosensitizer is incorporated into the composition. Ultraviolet radiation curing generally is preceded by lightly heating the electrocoating on the substrate in order to flow-out the electrocoating. The length of time the electrocoated substrate is exposed to the ultraviolet radiation can be decreased by increasing the viscosity or molecular weight of the electrocoating on the substrate.

The present invention takes advantage of the flowing-out step by obtaining a partial cure of the electrocoating during such light heating. Attendant with such partial curing is an increase in the molecular weight or viscosity of the electrocoating which allows a shorter time of subsequent ultraviolet irradiation of the coating to obtain full cure. Shorter total curing time of the electrocoating and total energy savings are thusly obtained.

SUMMARY OF THE INVENTION

The present invention is an improvement in process for electrodeposition from an aqueous electrocoating bath of an electrocoating composition onto a cathode substrate disposed within said bath, said electrocoating composition containing a polymer having pendant mercaptan groups and a polymer having pendant amine groups in combination with a cross-linking agent in an aqueous dispersion in said bath. Such improvement comprises:

a. providing said electrocoating composition containing
1. a polymer having at least about 1% by weight pendant mercaptan groups, said pendant mercaptan groups being protonated with acid to render said polymer water dispersible in said bath;
2. a polymer having at least about 1% by weight tertiary amine groups, said amine groups being attached to an alpha carbon of said polymer and said amine groups being protonated with acid to render said polymer water dispersible in said bath;
3. at least about 5% bis-maleimide cross-linking agent by weight of both said amine polymer and said mercaptan polymer; and
4. at least about 0.5% of an ultraviolet photosensitizer by weight of both said polymers.

The amine groups and mercaptan groups together comprise at least about 5% by weight of both polymers. The electrocoating composition is electrodeposited onto a cathode substrate disposed within said aqueous electrocoating bath by applying an electromotive potential through said bath. The pendant mercaptan groups and the pendant tertiary amine groups become deprotonated upon electrodeposition of said electrocoating composition. The electrocoating on the cathode substrate is cured by a combination of heating the electrocoating on the substrate (flowing-out) and irradiating the electrocoated substrate with ultraviolet radiation. The heat flowing-out step causes the pendant mercaptan groups to link with the bis-maleimide cross-linking agent by addition polymerization. The ultraviolet irradiation step causes the bis-maleimide to link with the alpha carbon of said tertiary amine groups. Advantageously, the heating step precedes the irradiation step. In a specific embodiment of the present invention, a single polymer contains both the mercaptan groups and the tertiary amine groups.

DETAILED DESCRIPTION OF THE INVENTION

The electrocoating composition contains a polymer or polymers selected according to final use from a wide variety of polymers known in the electrocoating art.

Representative polymers can be derived from epoxy and epoxy-modified diglycidyl ethers of bis-phenol A structures, various aliphatic polyethylene or polypropylene glycol (diglycidyl ether) adducts, and glycidyl ethers of phenolic resins, such epoxy resins being commercially available and commonly used in the electrocoating field. Other useful polymers include polyamide resins generally having a molecular weight of between about 500 and about 5,000; acrylic resins having molecular weight of about 1,000 to about 100,000; polyester resins and polyurethane resins each having a molecular weight range of about 500 to about 5,000; vinyl resins; and amine resins. Various other useful electrocoating polymers can be advantageously employed in the electrocoating composition of this application as will be apparent to those skilled in the art.

Referring now to the polymer containing pendant mercaptan groups, the mercaptan groups can be attached to the polymer by esterification of free-hydroxyl groups on the polymer (for example, a polyester) with a marcaptan-terminated acid, such as mereaptoprionic acid. Similarly, mercaptan groups can be introduced into the polymer by reacting pendant primary or secondary amine groups on a polymer with a mercaptan-terminated acid or by reacting the free isocyanate group on a mono-isocyanate-terminated polymer with a mercaptan-terminated ester having at least two pendant mercaptan groups. Mercaptan groups can be introduced into the polymer by numerous other methods which are well known in the art and as further exemplified in the examples of this application. The mercaptan groups are pendantly attached to the polymer. For purposes of this application, pendant mercaptan groups include terminal mercaptan groups. By pendantly attached is meant that such mercaptan groups are attached to the polymer chain or to a pendant side chain of the polymer. The polymer containing pendant mercaptan groups should contain at least about 1% by weight of such pendant mercaptan groups, and up to about 30% if desired. Advantageously, the proportion of mercaptan groups will be at least about 1% less by weight than the proportion of cross-linker and preferably the mercaptan groups will range from about 1% to about 4% by weight of the polymer to which they are attached. Generally, only a minor amount of mercaptan groups need be present in the electrocoating composition in order to obtain partial cure of the electrocoating by heating. Partial curing of the electrocoating builds molecular weight (viscosity) of the electrocoating which permits shorter UV irradiation times and/or less energy expenditure during UV irradiation of the electrocoating. If a major amount of mercaptan groups are present in the electrocoating composition, then the light heating or flowing-out step is practiced at a temperature and for a time such that only partial curing of the electrocoating results by such heating.

Partial cure of the electrocoating composition results from lightly heating or flowing-out the electrocoating film on the cathode substrate with the pendant mercaptan groups linking with the bis-maleimide by an addition polymerization reaction known as the Michael-type addition reaction, as more particularly described in "Organic Reactions," Vol. 10, (pages 179–555), John Wiley and Sons (1959), which is incorporated expressly herein by reference. The Michael-type addition reacts a mercaptan group with an alpha-, beta-ethylenically unsaturated carbonyl group in order to achieve linking of the mercaptan group with the unsaturation of the alpha-, beta-ethylenically unsaturated carbonyl group. The alpha-, beta-ethylenic unsaturation of the bis-maleimides is used in the instant invention.

Referring now to the polymer containing pendant tertiary amine groups, tertiary amine groups can be attached to the polymer by reacting free secondary amine groups with any polymer containing oxirane functionality such as, for example, an epoxy resin or a glycidyl-functional acrylic resin. Similarly, tertiary alkanolamines can be reacted with isocyanate-terminated polymers or esterified onto carboxyl-functional polyester polymers in order to attach the tertiary amine groups to the polymer. The tertiary amine groups are pendantly attached to the polymer. For purposes of this application, pendant amine groups include terminal amine groups. By pendantly attached is meant that such tertiary amine groups are attached to the polymer chain or to a pendant side chain of the polymer. The polymer containing pendant tertiary amine groups should contain at least about 1% by weight of such pendant amine groups and up to about 50% if desired. Advantageously, the polymer will contain only tertiary amine groups, though primary and secondary pendant amine groups can be present if desired. By ultraviolet irradiation of the electrocoated substrate, the alpha carbons of the pendant tertiary amine groups link with the unsaturation of the bis-maleimides in the presence of an ultraviolet photosensitizer by free radical addition polymerization. By alpha carbon of the tertiary amine group is meant the carbon in the alpha-position relative to the amine group and to which the pendant tertiary amine group is attached.

In a specific embodiment of the present invention, both the tertiary amine groups and mercaptan groups are pendantly attached to the same polymer as more fully detailed in the Examples which follow.

The instant electrocoating composition also can contain a resin or polymer having multiple ethylenic unsaturation (free radical reactors) such as multi-functional allylic unsaturated polymers, acrylics and methacrylics, acrylamides, unsaturated oils, and alkyds. Such ethylenically unsaturated compounds can polymerize into the electrocoating composition for obtaining the good properties of the fully cured electrocoating. The ethylenic unsaturation of allylic and vinyl unsaturated compounds is not activated (by a carbonyl group) and, thus, such unsaturated compounds do not participate in the Michael-type partial cure of the electrocoating by the heating step, but are linked into the electrocoating by the ultraviolet radiation curing step.

Ethylenically unsaturated compounds include, for example, diallylphthalate, triallylborate, triallylamine, diallylmaleate, diallylchlorendate, diallylamine adducts of epoxy resins, and triallylcyanurate. Additional unsaturated compounds include allylic unsaturated acrylics, epoxies, urethanes, and polyester polymers. Further ethylenically unsaturated compounds include alkyds synthesized with, for example, trimethylolpropane, pentaerythritol, phthalic anhydride, soybean oil, linseed oil, tung oil and the like.

The cross-linking agent is a bis-maleimide having alpha-, beta-ethylenic unsaturation capable of being reacted to cross-link the polymer or polymers of the instant electrocoating composition. Bis-maleimides can be represented by the following general structure:

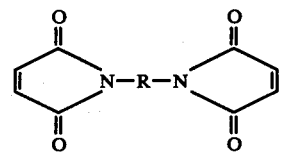

where R is alkyl, aryl, alkyl-aryl, or polymers having a molecular weight up to about 3,000. Alkylene-, aryl-bis-maleimides and combinations thereof are particularly useful as the cross-linking agent of this invention. Specific bismaleimides which are particularly suited to the precepts of this invention can be selected from the group consisting of dimethylenedimaleimide, trimethylenedimaleimide, tetramethylenedimaleimide, pentamethylenedimaleimide, hexamethylenedimaleimide, heptamethylenedimaleimide, decamethylenedimaleimide, 4,4'-methylene-bis-(orthochloroaniline), 4,4'-methylene-dianiline, 4,4'-methylene-bis-(3-nitroaniline), 4-aminophenylether, N,N'-orthophenylenedimaleimide, N,N'-paraphenylenedimaleimide, and N,N'-metaphenylenedimaleimide.

Bis-maleimides can be synthesized by various methods such as is disclosed in U.S. Pat. No. 2,444,536 and the same is incorporated herein by reference. Generally, a diluted ether solution of diamine is added to a similar diluted ether solution of maleic anhydride which results in a maleamic acid. The maleamic acid can be disposed in acidic anhydride and converted into the corresponding bis-maleimide in the presence of potassium acetate.

Ultraviolet (UV) sensitizers are combined with the electrocoating composition and are adapted to be simultaneously co-deposited with the composition onto the cathode substrate during the electrodeposition process. The UV sensitizers, responding to ultraviolet radiation, initiate the formation of an alpha carbon free radical which links with the bis-maleimide for full curing of the electrocoating on the substrate. Useful UV sensitizers or photosensitizers include halogenated polynuclear ketones as disclosed in copending Ser. No. 480,738 (filed June 19, 1976) and U.S. Pat. No. 3,827,957, the same incorporated expressly herein by reference. Other suitable UV sensitizers include organic carbonyl compounds selected from alkyl phenones, benzophenones, and tricyclic fused ring compounds as disclosed in U.S. Pat. No. 3,759,807 and incorporated expressly herein by reference. Further useful UV sensitizers include carbonylated phenol nuclear sulfonyl chlorides such as set forth in U.S. Pat. No. 3,827,959, and expressly incorporated herein by reference. Additional useful photosensitizer combinations particularly suitable for pigmented coatings are a combination of sensitizers comprising aromatic carbonyl compounds, aromatic aldehydes or aromatic ketones, and a synergistic sensitizer of about 0.05% to about 3% of 2,2'-dithiobis-(benzothiazole), as more particularly set forth in U.S. Pat. No. 3,847,771 and expressly incorporated herein by reference. At least about 0.5% by weight of ultraviolet sensitizer and preferably about 1% to 5% sensitizer is added to the polymer or polymers and thoroughly mixed or otherwise dispersed in the polymer phase prior to solubilizing the polymer in an aqueous dispersion.

Typical sources of ultraviolet energy ordinarily produce wavelengths in the ultraviolet spectrum that are transmitted through quartz and such wavelengths are usually between about 1,000 A and 4,000 A. Suitable ultraviolet emitters include various electric arc lamps, plasma arc torch, such as described in U.S. Pat. No. 3,364,487, and lasers having a lasing output in the ultraviolet spectrum as disclosed in copending U.S. Ser. No. 189,154 (filed Oct. 14, 1971, now abandoned), the disclosures of said references being incorporated expressly herein by reference. Other suitable sources of actinic light include quartz mercury lamps, ultraviolet quartz lamps, and high flash lamps.

In practicing this invention, the polymers are rendered water dispersible by adding sufficient acid to the polymers to completely neutralize the polymers. Appropriate acids are, for example, proton-donating acids such as phosphoric, sulfuric, hydrochloric, acetic, formic, lactic, and other proton-donating organic and inorganic acids. Water solubility is achieved by protonating with the acid of all of the mercaptan groups on the polymer containing mercaptan groups and the protonating all of the tertiary amine groups of the polymer containing tertiary amine groups. The protonating of the tertiary amine groups and the mercaptan groups also renders the polymers to which they are attached positively-charged so that during electrodeposition the polymers can migrate to the cathode substrate and be deposited thereon. Also, while the pendant mercaptan groups are protonated, such mercaptan groups will not react with the bis-maleimide as the polymer containing pendant protonated mercaptan groups is stable in water.

The neutralized-polymer phase (polymers and UV sensitizer) are blended with at least about 5% bis-maleimide cross-linking agent by weight of the polymers and up to about 25% if desired. The blend then is dispersed in water to form an aqueous electrocoating bath of from about 5% to about 20% nonvolatile dispersion. The bath generally is at about 60° to about 125° F., with about 70° to about 95° F. being preferred. The neutralized (protonated) polymers, bis-maleimide, and UV sensitizer all are stable in bath. The cathode substrate to be electrocoated then is immersed in the electrocoating bath while an electric potential is maintained therethrough as disclosed in U.S. Pat. No. 3,619,398, the same being incorporated herein by reference. During electrodeposition the positively charged polymers along with the bis-maleimide and the UV sensitizer migrate to the cathode substrate. The protonated tertiary amine groups and the protonated mercaptan groups become de-protonated (lose protons) due to the electric potential applied. The polymers, the bis-maleimide, and the UV sensitizer are co-deposited onto the cathode substrate. The electric potential applied to the bath generally is between about 20 and 500 volts, with about 50 to about 300 volts being preferred.

The coated substrate is removed from the bath and washed with water to remove excess coating. The electrodeposited coating on the cathode substrate then is dual cured with flow-out heating followed by ultraviolet irradiation in the presence of the UV sensitizer. Flow-out heating of the electrocoating film on the substrate is done at temperatures of about 180° to 400° F. for about 1 to about 20 minutes. Such flow-out or light heating evens out or flows-out the coating and partially cures the electrocoating by the linking of the unsaturation of the bis-maleimide cross-linking agent with the pendant mercaptan groups of the polymer containing the pendant mercaptan groups in a Michael-type addition reaction or addition polymerization. The partially cured electrocoating then is fully cured by ultraviolet irradiation thereof. Details of ultraviolet radiation curing of the instant electrocoating composition can be practiced in copending U.S. Ser. No. 480,738, the disclosure of which is incorporated expressly herein by reference.

The cathode substrate is an electrically conducive metal such as iron, steel, aluminum, copper, galvanized steel, zinc and like metals. The cathode substrate can be in the shape of bars, sheets, irregularly shaped forms with rounded or sharp edges and like shapes.

The electrocoating composition can contain opacifying pigments and inert extenders such as, for example, titanium dioxide, zinc oxide, clays such as kaolinite clays, silica, talc, and the like.

The following examples show how the instant invention can be practiced, but should not be construed as limiting the invention. In the specification all parts are parts by weight, all percentages are weight percentages, and all temperatures are degrees Fahrenheit unless otherwise expressly indicated.

EXAMPLE 1

One mole (1,800 grams) of DER 664 epoxy resin (Dow Epoxy Resin, epoxide equivalent weight of 875–975, Dow Chemical Company) was reacted with 1.2 moles of methyl ethanol amine in butylcellosolve solvent (50% by weight solution) in order to attach pendant tertiary amines to the epoxy polymer. The polymer having pendant mercaptan groups was commercially available Celanese Epicure 861 (equivalent weight of 163, Celanese Chemical Corp.). One hundred fifty grams of the Epicure polymer was dispersed in the solution containing the amine-functional epoxy polymer and the polymers completely neutralized with 5 moles of acetic acid.

The electrocoating bath comprised an 8% nonvolatile solids blend of the neutralized polymers, 200 grams of 1,6-hexamethylene-bis-maleimide cross-linker, and a UV sensitizer system comprising 5% benzophenone, 1% Michler's ketone, and 3% of 2,2'-dithiobis (benzothiazole). The blend (electrocoating composition) was cathodically electrodeposited onto a steel panel (cathode substrate) at 60 volts for 30 seconds.

The electrocoating covering the panel was lightly heated at 200° C. for 5 minutes to flow-out the electrocoating. The heated electrocoating displayed some solvent resistance, indicating that a partial cure of the electrocoating had taken place during the heating step. Full cure of the electrocoating was obtained by irradiating the partially cured electrocoating with ultraviolet radiation from an 800 watt medium pressure mercury lamp (ultraviolet radiation source) for 20 minutes.

EXAMPLE 2

The electrocoating composition was the same as the electrocoating composition of Example 1, except that the polymer having pendant mercaptan groups, Celanese Epicure 861, was reacted with the amine-functional epoxy polymer to yield a single polymer having both pendant tertiary amine groups and pendant mercaptan groups.

This electrocoating composition was dispersed in the bath, electrodeposited onto a steel panel, and dual cured in the same manner as described in Example 1. A fully cured electrocoating covered the panel upon dual curing thereof.

EXAMPLE 3

The procedures of Examples 1 and 2 were repeated except that the polymer having pendant mercaptan groups was trimethylolethane tri-(3-mercaptopropionate). Again, a fully cured electrocoating covered the panel upon the dual curing thereof.

EXAMPLE 4

Example 1 was repeated, except that 15% of triallyl cyanurate was added to the bath. Triallyl cyanurate contains a multiplicity of ethylenically unsaturated carbon-to-carbon groups, but such unsaturation is not activated (by a carbonyl group). The triallyl cyanurate linked into the electrocoating upon the UV irradiation of the electrocoating (subsequent to flowing-out of the electrocoating) to yield a fully cured electrocoated film on the panel.

EXAMPLE 5

A polyester polymer was prepared by reacting one mole of phthalic anhydride, one mole of succinic anhydride, and one mole of propylene glycol. This reaction was performed in toluene with azeotropic distillation of the water of reaction. This reaction product, an acid-terminated polyester, then was reacted with two moles of N,N-diethyl-1,4-pentanediamine (with the water of reaction being removed) in order to attach pendant tertiary amine groups to the polyester polymer.

The polymer containing pendant mercaptan groups was a mercaptan-terminated polyurethane polymer prepared by reacting 2 moles of toluene diisocyanate with one mole of poly-(tetramethylene ether glycol) (molecular weight of about 2,000), followed by a further reverse addition reaction with 2 moles of trimethylolpropane tri-(beta-mercaptopropionate).

The diamine-terminated polyester polymer and the mercaptan-terminated polyurethane polymer were completely neutralized with 6 moles of acetic acid, and blended with 20% by weight of meta-phenylene-bis-maleimide (cross-linking agent) and 10% by weight of the UV sensitizer system of benzophenone/acetophenone (1:1 weight ratio). The blend was dispersed in demineralized water to form an electrocoating bath of 10% non-volatile solids.

A steel panel was cathodically electrocoated with the electrocoating composition, washed with water to remove excess coating, and dual cured in a manner similar to that described in Example 1. A fully cured electrocoating covered the panel upon the dual curing thereof.

EXAMPLE 6

Example 5 was repeated, except that to the electrocoating composition (blend) was added 20% by weight of an unsaturated alkyd compound which was the reaction product of 60 parts refined soybean oil, 16 parts trimethylolpropane, 24 parts phthalic anhydride, and 2 parts pentaerythritoltriacrylate (all parts are parts by weight). The alkyd compound polymerized into the electrocoating upon dual curing of the electrocoating to yield a fully cured electrodeposited coating covering the panel.

EXAMPLE 7

One mole of a polypropylene oxide polymer (PPG 1025, molecular weight of about 1,000, Union Carbide Corp.) was reacted with 2 moles of toluene diisocyanate (molecular weight of 174.16) in dry butylcellosolve to form a diisocyanate-terminated prepolymer. Pendant tertiary amine groups were attached to the prepolymer by reacting the prepolymer with 1.943 moles of N,N-dimethylethanolamine (molecular weight of 89.14). Pendant mercaptan groups also were attached to the prepolymer by reacting the amine-functional prepolymer with 0.057 moles of the reaction product of neopentylglycol and mercaptopropionic acid (the reaction product being neopentylglycol dimercaptopropionate, molecular weight of 280.40). The polymer contained about 11% pendant tertiary amine groups and about 1% pendant mercaptan groups (based on the weight of the polymer).

The polymer was neutralized with acetic acid and blended with 20% by weight of 1,6-hexamethylene-bis-maleimide cross-linker and a UV photosensitizer system comprising 5% benzophenone, 1% Michler's ketone, and 3% 2,2'-dithiobis-(benzothiazole). The blend (or electrocoating composition) was let down in deionized water to form an electrocoating bath of 8% non-volatile solids and cathodically electrodeposited onto a steel panel at 60 volts for 30 seconds.

The coated panel was heated at 300° F. for 10 minutes to flow-out the coating. This heating resulted in a partial cure of the electrocoating (indicated by its moderate resistance to solvents) with attendant molecular weight increase. The flowed-out coating then was fully cured by subjecting the coating to UV irradiation from an 800 watt medium pressure mercury lamp for 20 minutes.

EXAMPLE 7a

An advantage of dual cure as practiced in this invention is the advantageous molecular weight build-up obtained by the heating or flowing-out step which permits shorter UV irradiation times. To demonstrate this advantage, an electrocoating bath was prepared in the manner set forth in Example 7, except that the mercaptan-functional polymer (neopentylglycol dimercaptopropionate) was omitted from the electrocoating composition. A panel was cathodically electrocoated and flowed-out in the same manner as described in Example 7. The electrocoating displayed no solvent resistance after its heating, indicating that no cure of the electrocoating had taken place. Full cure of the electrocoating was obtained after 30 minutes of UV irradiation of the electrocoating, or 10 minutes UV irradiation exposure time longer than the inventive electrocoating composition of Example 7 containing only 1% mercaptan groups.

EXAMPLE 8

The procedure of Example 7 was repeated except that 15% triallylcyanurate was added to the electrocoating composition. Dual cure of the electrocoating resulted in a fully cured coating covering the panel, indicating that the ethylenically unsaturated compound, triallylcyanurate, had linked into the coating system.

EXAMPLE 9

The procedure of Example 7 was repeated, except that the blend also contained 30% by weight of an unsaturated alkyd compound which was the reaction product of 60 parts refined soybean oil, 16 parts trimethylolpropane, 10 parts maleic anhydride, 14 parts phthalic anhydride, and 2 parts pentaerythritoltriacrylate (all parts are weight parts). A fully cured coating covered the panel upon dual cure of the electrodeposited coating.

EXAMPLE 10

The procedure of Example 7 was repeated, except the polymer having pendant mercaptan groups was trimethylolpropane tri-(beta-mercaptopropionate). A fully cured coating covered the panel up on dual curing of the electrodeposited coating.

EXAMPLE 11

The epoxy resin of Example 1 (DER 664) was reacted with one mole of methylethanolamine in butyl cellosolve (in order to attach pendant tertiary amine groups) followed by a further reaction with 0.5 moles of trimethylolpropane-tri-(beta-mercaptopropionate) (in order to attach pendant mercaptan groups).

The resulting polymer was neutralized with acetic acid and blended with 20% by weight of N,N'-paraphenylene-dimaleimide and a UV sensitizer system composed of 5% benzophenone, 1% Michler's ketone, and 3% of 2,2'-dithiobis-(benzothiazole). The blend was added to water to form an electrocoating bath of 10% non-volatiles.

A steel panel was immersed in the bath and cathodically electrocoated at 60 volts for 30 seconds. The coated panel then was dual cured in the same manner as described in Example 7.

EXAMPLE 12

An acrylic polymer was formulated by the solution polymerization of 40% styrene, 40% butyl acrylate, and 20% glycidyl methacrylate in butyl cellosolve solvent with azeotropic distillation of the water of reaction. Pendant tertiary amine groups and pendant mercaptan groups were attached to the polymer by reacting the acrylic polymer with 10% of diallylamine and 5% of neopentylglycol dimercaptopropionate, respectively.

The cross-linking agent was 20% by weight of 1,6-hexamethylene-bis-maleimide. The UV sensitizer system was 5% benzophenone, 1% Michler's ketone, and 3% 2,2'-dithiobis-(benzothiazole). The bath was formed, a panel cathodically electrocoated, and the resulting electrocoating dual cured in the same manner as described in Example 7. A fully cured, solvent-resistant coating resulted from the dual cure of the electrodeposited coating.

I claim:
1. A cathodic electrocoating composition dispersed in an aqueous electrocoating bath for electrodeposition onto a cathode substrate disposed within said bath for forming a curable electrodeposited coating on said cathode substrate comprising:
   a. a water-dispersed electrocoating polymer having at least about 1% by weight pendant mercaptan groups;
   b. a water-dispersed electrocoating polymer having at least about 1% by weight pendant tertiary amine groups, each said amine group being attached to an alpha carbon of said polymer;
   c. at least about 5% bis-maleimide cross-linking agent by weight of said polymers; and,
   d. at least about 0.5% ultraviolet photosensitizer by weight of said polymers;

said pendant amine groups and said pendant mercaptan groups together comprising at least about 5% by weight of said polymers, said electrodeposited coating of said electrocoating composition adapted to cure by heating said electrodeposited coating on said cathode substrate to cross-link said mercaptan groups with said bis-maleimide to partially cure said coating followed by irradiating with ultraviolet radiation said partially cured coating to cross-link said alpha carbon of said polymer having said pendant amine groups with said bis-maleimide to fully cure said coating on said cathode substrate.

2. The electrocoating composition of claim 1 wherein said polymer having pendant mercaptan groups and said polymer having pendant tertiary amine groups are the same polymer.

3. The electrocoating composition of claim 1 wherein said bis-maleimide is represented by the following general structure:

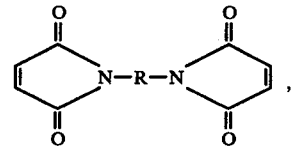

where R is alkyl, aryl, alkyl-aryl, or polymers having a molecular weight up to about 3,000.

4. The electrocoating composition of claim 1 wherein the proportion of said pendant mercaptan groups is at least about 1% by weight less than the proportion of said bis-maleimide cross-linking agent in said electrocoating composition.

5. The electrocoating composition of claim 1 wherein said polymer containing pendant mercaptan group contains between about 1% and about 4% by weight of said polymer of said pendant mercaptan groups.

6. The electrocoating composition of claim 2 wherein said polymer having both pendant mercaptan groups and pendant tertiary amine groups contains beteen about 1% and about 4% by weight of said polymer of said pendant mercaptan groups.

7. The electrocoating composition of claim 1 wherein said electrocoating composition additionally contains an ethylenically unsaturated compound having a multiplicity of ethylenic unsaturation.

8. The electocoating composition of claim 2 wherein said electrocoating composition additionally contains an ethylenically unsaturated compound having a multiplicity of ethylenic unsaturation.

* * * * *